Aug. 16, 1949. D. E. CARR 2,479,470
ASPHALTIC JET PROPULSION FUEL
Filed March 13, 1944
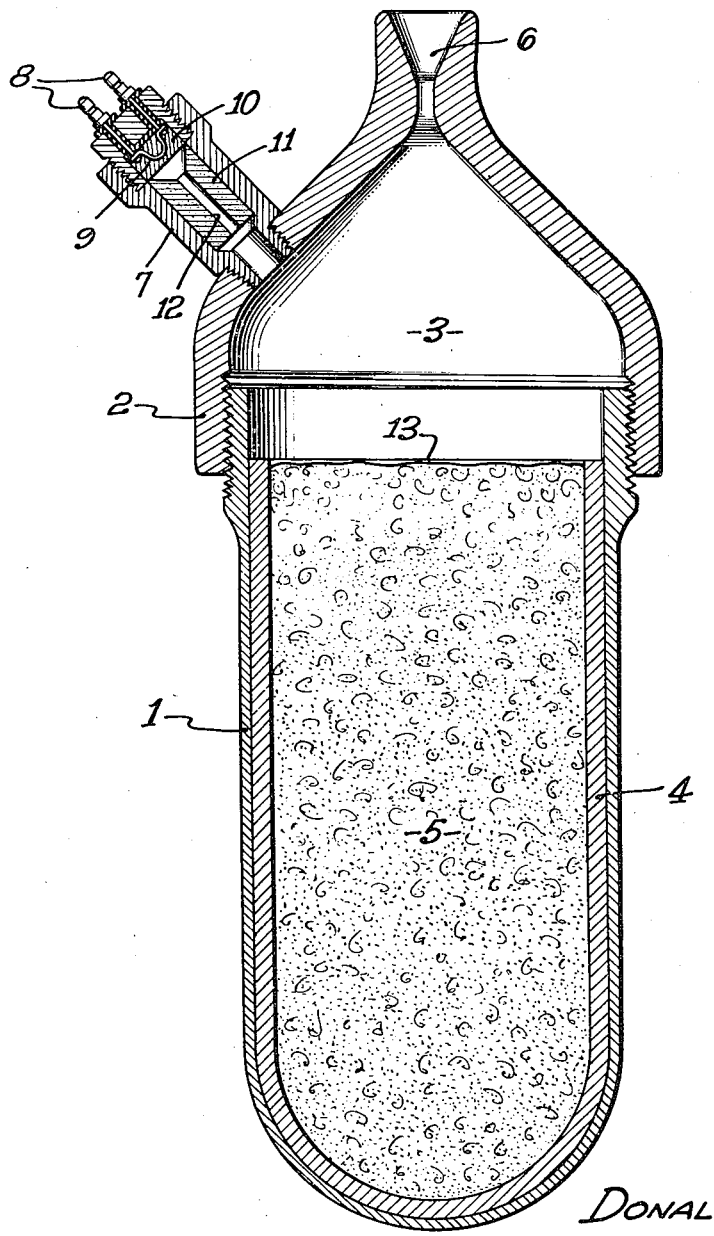
DONALD E. CARR,
INVENTOR
BY Ross J. Garofalo
ATTORNEY.

Patented Aug. 16, 1949

2,479,470

UNITED STATES PATENT OFFICE 2,479,470

ASPHALTIC JET PROPULSION FUEL

Donald E. Carr, Los Angeles, Calif., assignor to Union Oil Company of California, Los Angeles, Calif., a corporation of California Application March 13, 1944, Serial No. 526,219

12 Claims. (Cl. 52—18)

This invention relates to a plastic fuel which is particularly suitable for use in jet propulsion motors, commonly known as rocket motors.

There are a number of types of jet propulsion motors known today, in most of which a fuel is burned in a combustion chamber fitted with a jet or nozzle through which the products of combustion must escape, and in escaping, provide a propulsive force. In one of the most convenient types of such motors, the fuel is stored in the combustion chamber itself, and is burned with the aid of an oxidizer which is also stored in the combustion chamber, thus avoiding the need for complicated feeding arrangements. To provide a continuous thrusting force rather than a single wasteful and possibly destructive explosion however, it is necessary for this type of motor that the combustion be so controlled that only a portion of the fuel be allowed to burn at a time. This is conveniently accomplished by employing a plastic fuel and incorporating a solid oxidizer therein, and so packing this propellant mixture in the chamber that the combustion will occur only at the exposed surface of the mixture. For this type of use it is essential that a fuel having certain specific characteristics be employed, as described below, and the principal object of this invention is to provide such a fuel which has outstanding merit.

The attached drawing shows one form of jet propulsion motor for which the plastic fuels of this invention are particularly suitable. This type of motor may be employed for example to assist take-off for a heavily loaded plane, the entire motor being dropped as soon as the charge is burned. It may also be used in other situations as an auxiliary to the conventional power plant where an extra surge of power is required.

Referring to the drawing, the jet propulsion motor there shown consists of a shell 1 and a cap 2, enclosing a combustion chamber 3. The combustion chamber is largely filled with a charge consisting of a liner 4 and a propellant mixture 5 comprising a plastic fuel and an oxidizer. The cap is provided with a jet 6 through which the products of combustion pass, and an igniting device 7 for initiating the combustion.

Jet 6 is suitably designed so as to allow the hot gaseous products of combustion to issue at an extremely high velocity and thus provide a propulsive thrust on the entire motor. If operated in the vertical position shown, the thrust would be downward. If a horizontal thrust is desired, the motor would be mounted horizontally. It is preferred however, that when in storage prior to use the motor be maintained in a vertical position as shown, so as to keep the surface of the propellant mixture from sagging from its normal position, which is approximately at right angles to the axis of the jet.

The igniting device 7 may be of any design which will provide for ignition of the propellant mixture 5 at the time desired. In the particular device shown, application of a source of electric current to terminals 8, heats filament 9 to a sufficiently high temperature to ignite the primary combustible mixture 10, which in turn serves to ignite secondary combustible mixture 11. The products of this combustion are allowed to escape through passage 12 and impinge on the exposed surface 13 of propellant mixture 5, thus igniting it. Combustible mixtures 10 and 11 may be the same composition as propellant mixture 5 if desired, or any other suitable mixture.

As mentioned previously, it is desirable to have the combustion of propellant mixture 5 proceed in an orderly fashion so as to supply a prolonged thrust of relatively constant intensity rather than a single explosive burst. This is accomplished by allowing the mixture to become heated to its ignition temperature only at the exposed surface, and not allowing hot combustion products to reach the bulk of the propellant mixture through cracks in the heart of the mixture, or cracks or openings between the shell 1 and the propellant mixture 5. In this regard the character of the propellant mixture and the liner 4 are of extreme importance, since the conditions of operation of these motors are so rigorous and vary so widely. For example, a rocket motor may be stored in the desert at a temperature of 110° F. or higher and suddenly be taken up in the stratosphere to be operated at a temperature of —40° F. or lower. Even though the fuel in the propellant mixture must contract in volume by more than 5% under such conditions, it must not allow fissures to develop in the body of the propellant mixture. The liner also must not crack nor break away from the propellant mixture nor shrink from the walls. Even very tiny fissures can not be tolerated, since the combustion gases may have a temperature in the neighborhood of about 2000° F., and are under pressures as high as 60.000 lb./sq. in. or higher. When no fissures develop, only the surface 13 burns, and the level of the charge in the chamber drops at a desirable rate such as about ¼ inch to 30 inches per second, but when fissures develop and result in explosive combustion throughout the mass, the combustion may be propagated at velocities such as about 1000 ft./second or higher, even exceeding the velocity of sound in some instances.

It is an object of this invention to provide new plastic fuels that will meet the above requirements. It is a specific object of this invention to produce a plastic or asphalt-like material which may be employed as a fuel, coating or the like. Further objects are to provide methods for making these fuels, and propellant mixtures, liners, and rocket motor charges all involving the new plastic fuels. Each of these will first be described very briefly as follows:

The plastic fuels of this invention are asphalt-like in appearance, but have characteristics unlike those of any ordinary asphalts, in that they have "melting" points (ASTM softening point method D36–26) greater than about 175° F., and yet have penetrations at 32° F. which are greater than 300 (using the standard penetrometer described in ASTM method D5–25, with the 200 g. weight, 60 seconds). They also usually have penetrations at 77° F. which are over 300 (using the standard penetrometer with the 100 g. weight, 5 seconds). For example, a plastic fuel of this invention having a melting point of about 200° F. will have a penetration at 32° F. greater than 300, whereas ordinary steam-blown or air-blown asphalts of the same melting points will have penetrations of only 0 to 20. Fuels prepared by the preferred procedure of this invention have penetrations greater than 100 at 32° F. even when using the 100 g. weight for only 5 seconds. In fact they are frequently so soft that their penetrations are over 300 under the latter conditions, and therefore must be measured with only the 50 g. weight for 5 seconds. Employing the latter test, their penetrations are above 30, and usually above 100. These fuels are prepared by controlled oxidation of high quality lubricating oils which are substantially free from wax.

The propellant mixtures of this invention comprise the above plastic fuels commingled with solid powdered oxidizers in proportions preferably such that the fuel is present in moderate "molal" excess, i. e., excess over the amount which would be consumed by the oxidizer under theoretical conditions of complete combustion. For example, when using potassium perchlorate, which is a preferred oxidizer for the purposes of this invention, theoretically complete combustion of the fuel to carbon dioxide and water, with reduction of the perchlorate to chloride, would require nearly 90 parts by weight of oxidizer to 10 parts by weight of fuel. Therefore, a very satisfactory proportion of oxidizer in the propellant mixture is about 75% although proportions between about 50% and 90% may be used.

As a liner for use between the propellant mixture and the shell of the combustion chamber, two materials have been found to be exceptionally useful. One is the plastic fuel of this invention, and the other is rubber, either natural or synthetic type. The exceptional plasticity of the former, and the resiliency of the latter make them of unusual value. Combinations of the two may also be used, such as rubber sheath sealed to the propellant mixture and to the combustion chamber walls by a coating of the plastic fuel. The liner should have a thickness between about 2% and about 10% of the diameter of the combustion chamber.

The rocket motor charge comprises the combination of the propellant mixture and the liner.

In the preparation of the plastic fuels of this invention the selection of the stock is of extreme importance. A lubricating oil stock having a "V. G. C." or viscosity gravity constant (Hill and Coates, Jour. Ind. & Eng. Chem. vol. 20, p. 641, 1928) lower than approximately 0.90, and preferably lower than about 0.83 and which is substantially free from wax, must be employed. It is highly desirable that the fuel have a "V. I." or viscosity index (Dean and Davis, Chem. & Met. Eng. vol. 36, p. 618, 1929) greater than approximately 0 and preferably greater than about 60. Other desirable characteristics are that the flash point be above about 400° F., that the viscosity of the oil at 210° F. should not exceed about 200 S. S. U., and that the oil contain a major proportion of constituents having viscosities above about 50 S. S. U. at 210° F., i. e., that when half of the oil is removed by distillation, the residue shall have a viscosity greater than 50 S. S. U. at 210° F. These characteristics are satisfied by dewaxed lubricating oil stocks obtained from Eastern or paraffinic type crude oils; or by dewaxed raffinate oils prepared by conventional solvent extraction and dewaxing of Western or naphthenic type lubricating oil stocks. In the extraction selective solvents such as sulfur dioxide, phenol, furfural and the like may be employed, and in the dewaxing normally gaseous paraffins such as propane or other dewaxing solvents such as acetone, methyl ethyl ketone and the like may be employed. If present, asphalt may also be removed, as by treatment with propane and the like. It has also been found that used lubricating oil (crankcase drainings) of reasonably high quality, having the viscosity gravity constant requirements specified above, is a very satisfactory stock. It is usually contaminated with light oil and gasoline fractions, however, which should be removed to the extent necessary to raise the flash point of the residual oil to a value above about 400° F.

In the preparation of the fuel from the above stocks, the oxidation is carried out preferably by air-blowing. In carrying this out, the stock may be charged to a suitable air-blowing apparatus to obtain intimate admixture of the charge with air, such as the Gard-Aldridge apparatus described in U. S. Patent 2,170,496, and oxidized by blowing air at a rate between 0.5 and 5 cubic feet per minute per barrel through the stock while maintaining it at a temperature between about 350° and 475° F. Catalysts which promote oxidation may be employed if desired. For example, by blowing a used lubricating oil in the air-blowing apparatus at a temperature of 430–445° F., an air rate of 2 cubic feet per minute per barrel at atmospheric pressure for a period of about 20 hours, a satisfactory product having a melting point of approximately 200° F. was prepared. The characteristics of the stock and the product are tabulated as follows:

| | Stock | Product |
|---|---|---|
| Viscosity-gravity constant (V. G. C.) | 0.826 | |
| Pour Point, °F | 0 | |
| Viscosity Index (VI) | 92 | |
| Flash, C. O. C. (ASTM D92-33), °F | 455 | 430 |
| Viscosity at 210° F., Saybolt Univ., sec | 75 | |
| Specific Gravity, 60°/60° F | 0.899 | 0.937 |
| Ductility at 77° F., (ASTM D113-39) | | 1.3 |
| Melting Point (ASTM D36-26), °F | | 205 |
| Penetration (ASTM D5-25) at 32° F.: | | |
| 50 g. wt., 5 sec | | 183 |
| 100 g. wt., 5 sec | | over 300 |
| 200 g. wt., 60 sec | | over 300 |
| Penetration (ASTM D5-25) at 77° F., 100 g. wt., 5 sec | | over 300 |
| Loss on Heating (ASTM D6-39T) 5 hr., 50 g., 325° F.) sec | | 0.3 |
| Melting Point after heating | | 213 |
| Penetration after heating (32° F., 50 g., 5 sec.) | | 172 |
| Ash, percent by weight (ASTM D482-38T) | | 0.05 |
| Solubility in CCl$_4$ (ASTM D165-42), percent | | 99.8 |
| Solubility in CS$_2$ (ASTM D4-42), percent | | 99.8 |

As mentioned previously the outstanding characteristics of the products are their unusually high penetrations for a given melting point. It may also be noted that the susceptibility of the penetration to change in temperature is extremely low making the use of these fuels under widely varying temperature conditions highly practical. The ductility of the product is high and this is of distinct advantage in preventing development of fissures in service as described above. On this score it may be noted that the absence of substantial amounts of wax in the stock results in high ductility products. The low value of the loss on heating and the slight changes in melting point and penetration after heating are indications of thermal stability of the product and are very desirable characteristics. The high flash point, low ash content, and high solubility in carbon bisulphide and carbon tetrachloride are also desirable characteristics.

The oxidizers which are compounded with the above plastic fuels in the preparation of the propellant mixtures of this invention are preferably perchlorates. Potassium perchlorate is especially suitable but sodium and ammonium perchlorates are also suitable. Chlorates, chlorites and hypochlorites may be used although they are somewhat less efficient on a weight basis. Perchlorates, dichromates and chromates are also highly desirable oxidizers, and chromites may also be used although they are somewhat less efficient. Persulphates may also be employed. Although the potassium and sodium salts are preferred, salts of other metals such as calcium, magnesium, aluminum and the like may also be employed.

In preparing the propellant mixtures of this invention the above oxidizers are powdered to sizes preferably finer than about 200 mesh. The plastic fuel is then melted and the powders are incorporated therein until a substantially uniform mixture is obtained. As an example of a highly suitable propellant mixture potassium perchlorate was ground to pass 325 mesh and a mixture was prepared containing 75% of the powdered perchlorate and 25% of plastic fuel having substantially the characteristics described above. This mixture when cooled and placed in a vertical position showed no tendency to slump or sag even at temperatures as high as 140° F. The importance of this characteristic is obvious since slumping of the propellant mixture might result in plugging of the orifice in a jet propulsion motor of the type shown in the drawing. When a propellant mixture of the above quality is employed it is hardly necessary to store the jet propulsion motor in a vertical position as specified previously.

In charging the jet propulsion motor, the combustion chamber is first provided with a liner. Where this liner is the plastic fuel of this invention the fuel may be melted and poured into the combustion chamber which is suitably tilted and revolved so as to provide a uniform layer of the desired thickness on the walls of the chamber. After cooling sufficiently to assure no slumping of this liner the propellant mixture as described above is heated and poured into the prepared chamber. If a rubber liner is employed this may be bonded to the combustion chamber by any suitable cement preferably by use of the plastic fuel itself and the rubber liner may then be lined with the plastic fuel as described above and the propellant mixture added.

Although the plastic fuel as described above is particularly suitable for use in jet propulsion motors in the above manner, there are other uses for which the plastic fuels of this invention are of outstanding merit. For example, they may be used as fillers for grease, or as constituents of rust-preventive compositions, coatings, and the like.

Where the term "melting point" is used in this specification and claims it is to be understood that the ASTM softening point test method D36—26 is meant. When the term "penetration at 32° F." is employed it is to be understood that the standard ASTM penetrometer and technic shown in ASTM method D5—25 employing the 200 g. weight for 60 seconds is meant unless otherwise specified; and where the term "penetration at 77° F." is employed it is to be understood that the same ASTM test is employed using the 100 g. weight for 5 seconds. When the term "substantially free from wax" is employed it is meant that the pour point of the oil is below about 25° F. It is to be understood that this limit will vary somewhat with the viscosity of the oil. For example, an oil of approximately S. A. E. 20 grade which is substantially free from wax will have a pour point below about 0° F., whereas an oil of S. A. E. 60 grade which is substantially free from wax may have a pour point of the viscosity pour type in the neighborhood of 40° F. By the term "used lubricating oil" is meant an oil which has been employed in service equivalent to use in an automotive engine crankcase for about 1000 miles of driving.

It is apparent that the above plastic fuels may be blended with less desirable fuels to improve their characteristics, and that other additives such as anti-oxidants, dyes and the like may be employed therewith. Other modifications of this invention which would occur to one skilled in the art are to be included in the scope of the invention as defined in the following claims.

I claim:

1. A plastic fuel derived from mineral oil having a melting point greater than about 175° F. and a penetration at 32° F. greater than 300 using the ASTM standard penetrometer with the 200 gram weight and 60 second time.

2. A plastic fuel according to claim 1 which also has a penetration at 77° F. greater than 300 using the ASTM standard penetrometer with the 200 gram weight and 60 second time.

3. A plastic fuel derived from mineral oil having a melting point greater than about 175° F. and a penetration at 32° F. greater than 30 using the ASTM standard penetrometer with the 50 g. weight and 5 second time.

4. A plastic fuel according to claim 3 which also has a penetration at 77° F. greater than 300 using the ASTM standard penetrometer with the 100 g. weight and 5 second time.

5. A plastic fuel having a melting point greater than about 175° F. and a penetration at 32° F. greater than 300 using the ASTM standard penetrometer with the 200 gram weight and 60 second time, said fuel being prepared by oxidizing a hydrocarbon feed stock comprising a mineral lubricating oil which is substantially free from wax and has a V. G. C. lower than about 0.90.

6. A method of preparing a plastic fuel which comprises subjecting a hydrocarbon feed stock to an elevated temperature in the presence of oxygen so as to obtain a product having a melting point greater than about 175° F. and a penetration at 32° F. greater than 30 using the ASTM standard penetrometer with the 50 g. weight and 5 second time, said feed stock comprising a mineral lubricating oil which is substantially free from wax and has a V. G. C. lower than about 0.90.

7. A propellant mixture which comprises a solid inorganic salt oxidizer and a plastic fuel prepared as in claim 6.

8. A charge for a jet propulsion motor which comprises a liner consisting of a plastic fuel, and a propellant mixture comprising a solid inorganic salt oxidizer and a plastic fuel, said plastic fuel being prepared as in claim 6.

9. A plastic fuel derived from oxidation of a mineral oil and having a melting point greater than about 175° F., and a penetration at 32° F. greater than 100 when tested with the 100 gram weight for 5 seconds.

10. A plastic fuel having a melting point greater than about 175° F. and a penetration at 32° F. greater than 300 using the ASTM standard penetrometer with the 200 grams weight and 60 second time, said fuel being prepared by subjecting a hydrocarbon feed stock to an elevated temperature in the presence of oxygen, said feed stock comprising a mineral lubricating oil which is substantially free from wax and has a V. G. C. lower than about 0.83.

11. A plastic fuel according to claim 10 in which the feed stock is a used lubricating oil.

12. A propellant mixture which comprises a perchlorate salt and a plastic fuel prepared as in claim 6.

DONALD E. CARR.

REFERENCES CITED

The following references are of record in the file of this patent:

UNITED STATES PATENTS

| Number | Name | Date |
|---|---|---|
| 933,060 | Clement | Sept. 7, 1909 |
| 1,214,766 | Donner | Feb. 6, 1917 |
| 1,889,365 | Loebel | Nov. 29, 1932 |
| 2,076,799 | Thurston | Apr. 13, 1937 |
| 2,080,688 | Bray | May 18, 1937 |
| 2,343,789 | Morris | Mar. 7, 1944 |

FOREIGN PATENTS

| Number | Country | Date |
|---|---|---|
| 51,814 | Switzerland | Apr. 7, 1910 |
| 477,678 | France | Aug. 3, 1915 |
| 688,883 | France | May 19, 1930 |
| 363,919 | France | May 17, 1906 |
| 86,201 | Switzerland | Oct. 27, 1919 |
| 1,573 | Great Britain | 1906 |

OTHER REFERENCES

Abraham, "Asphalts and Allied Substances," 4th ed., Table facing page 452; published by D. Van Nostrand Co., New York, N. Y., 1938.